(12) United States Patent
Gray

(10) Patent No.: US 9,162,709 B2
(45) Date of Patent: Oct. 20, 2015

(54) FENDER EXTENSION

(71) Applicant: Eric Gray, Indian Head (CA)

(72) Inventor: Eric Gray, Indian Head (CA)

( * ) Notice: Subject to any disclaimer, the term of this patent is extended or adjusted under 35 U.S.C. 154(b) by 0 days.

(21) Appl. No.: 14/095,400

(22) Filed: Dec. 3, 2013

(65) Prior Publication Data
US 2015/0151794 A1 Jun. 4, 2015

(51) Int. Cl.
B62D 25/18 (2006.01)

(52) U.S. Cl.
CPC .................................. B62D 25/18 (2013.01)

(58) Field of Classification Search
CPC ...... B62D 25/16; B62D 25/18; B62D 25/163; B62D 25/166; B62D 25/168; B62D 25/182; B62D 25/184; B62D 25/186
USPC ......... 280/848, 847, 849, 850, 851, 853, 159, 280/160, 854; 296/198
See application file for complete search history.

(56) References Cited

U.S. PATENT DOCUMENTS

| 2,940,773 | A | * | 6/1960 | Eaves | 280/851 |
| 4,169,608 | A | * | 10/1979 | Logan | 280/848 |
| 4,174,850 | A | * | 11/1979 | Hart | 280/848 |
| 4,215,873 | A | * | 8/1980 | Price | 280/848 |
| 4,447,067 | A | * | 5/1984 | Yamashita | 280/848 |
| 4,591,178 | A | * | 5/1986 | Mortvedt et al. | 280/154 |
| 4,715,648 | A | * | 12/1987 | Hensel | 296/198 |
| 5,238,268 | A | * | 8/1993 | Logan | 280/848 |
| 5,340,154 | A | * | 8/1994 | Scott | 280/848 |
| 5,879,045 | A | * | 3/1999 | Logan | 296/136.07 |
| 6,070,908 | A | * | 6/2000 | Skrzypchak | 280/847 |
| 6,533,323 | B1 | * | 3/2003 | Weaver | 280/847 |
| 7,222,884 | B2 | * | 5/2007 | Callan et al. | 280/848 |
| 9,027,983 | B2 | * | 5/2015 | Butler et al. | 280/847 |
| 2014/0175838 | A1 | * | 6/2014 | Epple et al. | 296/198 |

* cited by examiner

Primary Examiner — James M Dolak
(74) Attorney, Agent, or Firm — Adrian D. Battison; Ade & Company Inc.

(57) ABSTRACT

An arched fender extension portion is attached along an edge of an existing fender of an agricultural vehicle with a common curvature and lying in a common plane by a pair of brackets mounted on the existing fender at longitudinally spaced fastening arrangements thereof. The extension portion includes two bolt connectors arranged to pull the flat edge of the extension portion into butting engagement with the outer side edge of the existing fender inwardly of an edge flange portion of the existing fender.

13 Claims, 3 Drawing Sheets

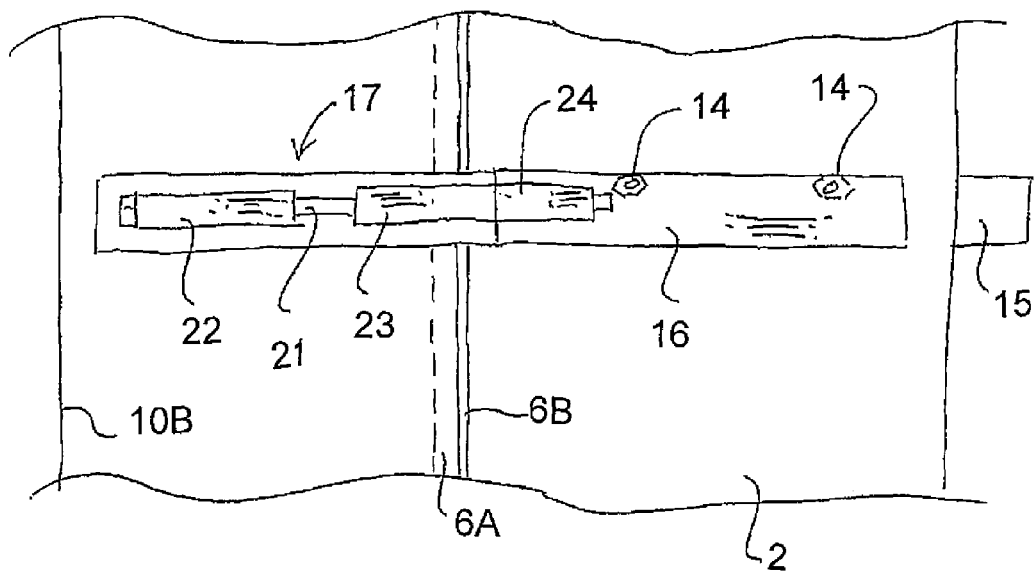
FIG.2
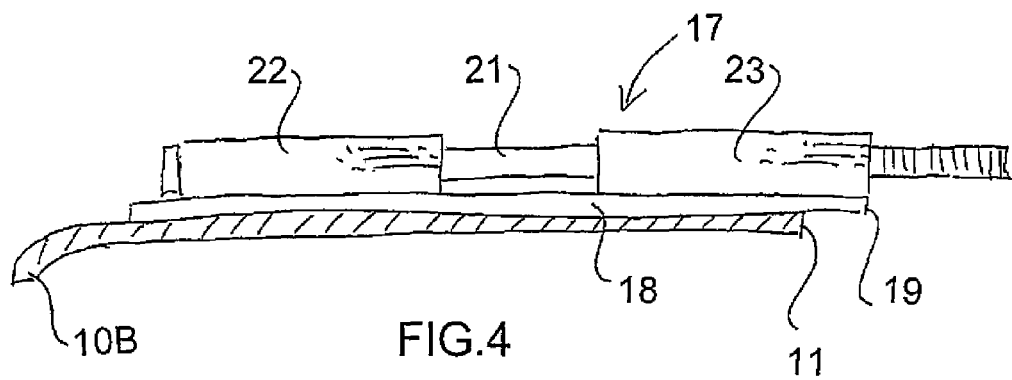
FIG.4
FIG.5
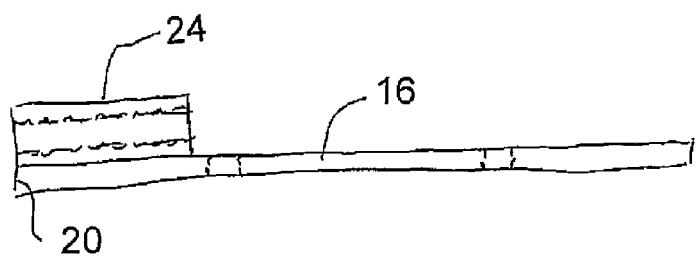

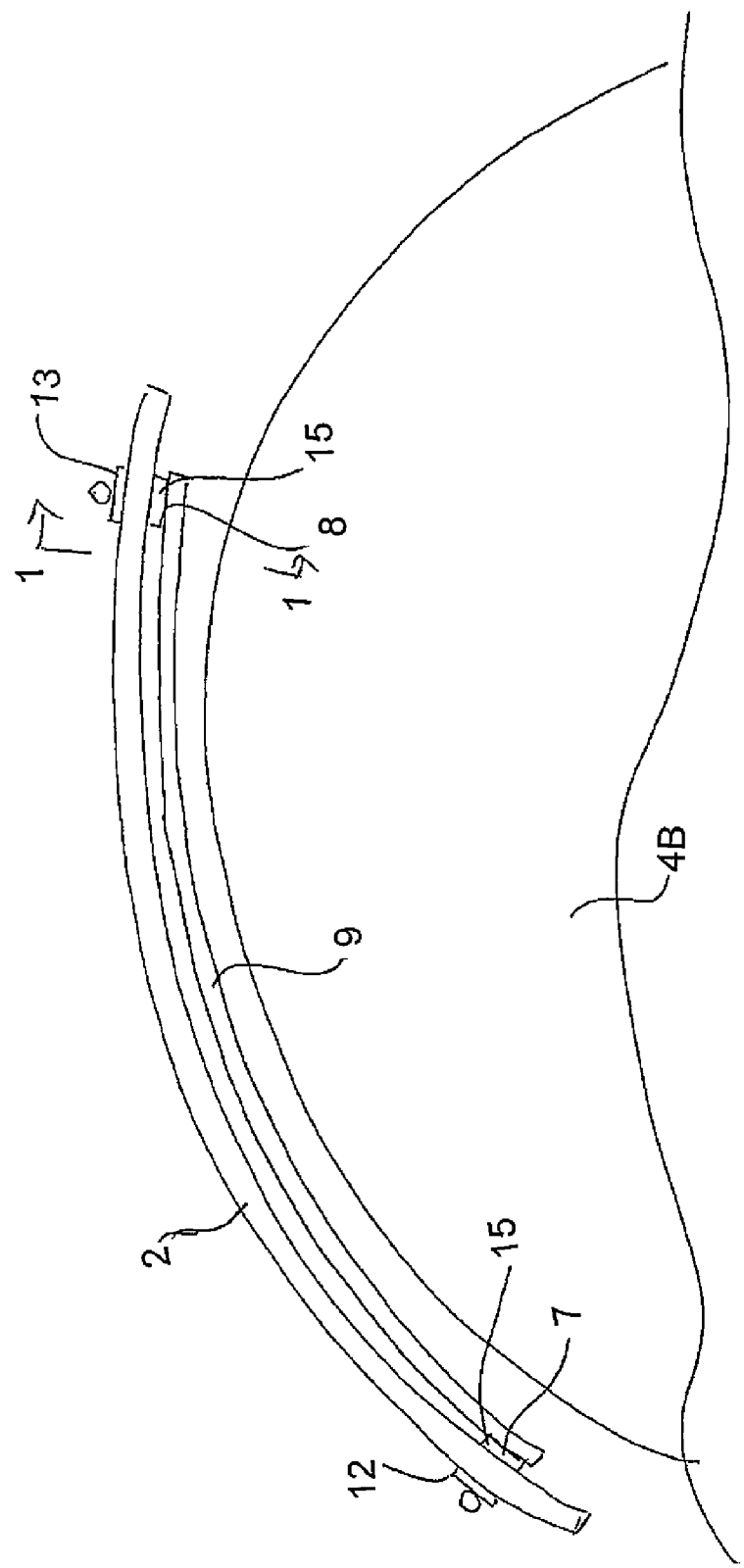

FENDER EXTENSION

This invention relates to locks and more particularly to a security device attached to a door lock used to prevent tampering or attacks.

BACKGROUND OF THE INVENTION

Self-propelled high clearance sprayers have become widely adopted implements now used to apply pesticides for the production of crops in North America. When used in crops they typically employ four narrow tires (approximately 30 cm wide) to minimize the damage to crops. In wet conditions, and in pre-seeding or post-harvest, it is common to switch to wide tires (approximately 60 cm wide) which give the sprayer better floatation to reduce rutting in the fields.

Until about two years ago sprayers were only sold with narrow fenders. While these fenders were effective in reducing the amount of mud flung up from narrow tires, they were very ineffective with the wider tires. This is a very significant problem given that the wider tires tend to be used in wetter conditions. As a result, when narrow fenders are used with the wider tires, the sprayers often get covered with mud, which tends to plug and break spray nozzles, add unnecessary weight to the machine, increase the risk of transporting soil born pests between fields, and increase washing time and effort for the sprayer operation.

In the last year, the two major manufactures (Case IH and John Deere) have provided an option to purchase wide fenders. While wide fenders have addressed the mud flinging with the wide tires it has created other problems. If the wide fenders are used with narrow tires they make the sprayer wider to drive, store and transport on roads, and also create damage in tall standing crops and reduce the aesthetic appearance. While buying two sets of fenders is an option, this is very expensive and substantial time and labour is required to change the fenders as needed.

SUMMARY OF THE INVENTION

According to the invention there is provided a fender extension apparatus for attachment to an existing fender of an agricultural vehicle;

where the agricultural vehicle comprises a wheel and an arched existing fender over the wheel having an inner side edge of the existing fender and an outer side edge of the existing fender, the existing fender being mounted at spaced positions along the existing fender on the vehicle so as to partly surround the wheel;

the apparatus comprising:

an arched fender extension portion having a curvature matching that of the existing fender of the vehicle;

an edge of the arched fender extension portion being arranged to butt against the outer side edge of the existing fender;

a first bracket mounted on the existing fender;

a second bracket mounted on the existing fender at a position spaced longitudinally of the first bracket;

a first connector mounted on the arched fender extension portion for engaging the first bracket and arranged to pull the edge of the arched fender extension portion into butting engagement with the outer side edge of the existing fender;

and a second connector mounted on the arched fender extension portion for engaging the second bracket and arranged to pull the edge of the arched fender extension portion into butting engagement with the outer side edge of the existing fender.

In this new product, as described in more detail hereinafter, we are able to solve many of the fender related issues by creating easy to put on and take off fender extensions. These allow producers to quickly increase the width of the fender when wide tires are required, and to reduce the width by removing the fender extensions when narrow tires are put on the sprayer.

The arrangement described herein can provide one or more of the following features Four "easy-on" "easy-off" fender extensions which are added to narrow fenders to cover wide tires.

Solid bolt on connections.

Easy first time installation of bracket.

The extender brackets bolt on existing fenders. No drilling required.

Rugged polyethylene fender extensions won't rust or dent.

Stacking the fender extenders make then easy to ship, store and handle.

The following advantages may be obtained:

Extensions are better than narrow fenders.

Improved mud protection for wide tires.

Reduced labour and downtime in washing.

Reduced nozzle damage.

Reduced field soil contamination.

Reduced mud-related corrosion and rust.

Reduced weight from carrying soil.

Better fuel economy, reduced machine stress, better performance.

Smaller ruts.

Better aesthetics with narrow tires.

Reduced transport and storage widths.

Reduced tall crop fender damage.

Extensions are better than two sets of fenders

Faster to change that two sets of fenders.

Easier to store than two sets of fenders.

Preferably the first and second brackets are mounted on fasteners of the existing fender at the respective spaced mounting locations.

Preferably each of the brackets comprises a flat strap fastened onto an upper surface of the existing fender so as to extend in a direction across the existing fender.

Preferably each of the connectors comprises a flat strap fastened onto an upper surface of the arched fender extension portion so as to extend in a direction across the arched fender extension portion. Preferably the end of the first flat strap engages end of the second flat strap and the end of the second flat strap is located outwardly of the edge of the arched fender extension portion.

Preferably each of the connectors includes a bolt mounted in a sleeve extending in a direction across the arched fender extension portion which engages into a threaded sleeve of the respective bracket. However other fastening arrangements may be used which pull the fender components inwardly toward one another and act to hold the fender portions in a common plane Preferably the edge of the arched fender extension portion lies in a common plane with a body of the arched fender extension portion and with a body of the existing fender.

Preferably an outer edge of the arched fender extension portion is downwardly curved out of the common plane.

Preferably the outer side edge of the existing fender includes a down turned flange portion so that the edge of the arched fender extension portion butts the existing fender at a position spaced inwardly of the flange portion.

Preferably a width of the arched fender extension portion is substantially equal to a width of the existing fender.

BRIEF DESCRIPTION OF THE DRAWINGS

One embodiment of the invention will now be described in conjunction with the accompanying drawings in which:

FIG. 2 is a top plan view of the components of FIG. 1.

FIG. 3 is a side elevational view of the components of FIG. 1.

FIG. 4 is a cross-sectional view on an enlarged scale of the arched fender extension portion and connector thereof of FIG. 1.

FIG. 5 is a cross-sectional view on an enlarged scale of the bracket of FIG. 1.

In the drawings like characters of reference indicate corresponding parts in the different figures.

DETAILED DESCRIPTION

Figure 1:
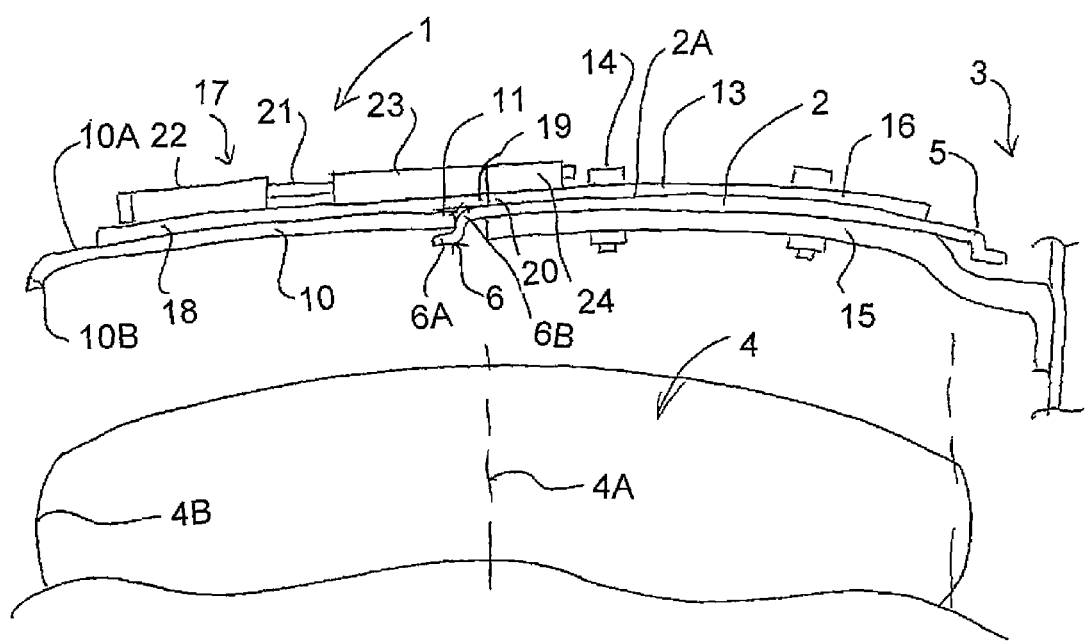
FIG. 1 is a cross-sectional view through a wheel, existing fender and arched fender extension portion according to the present invention.

A fender extension apparatus 1 is provided for attachment to an existing fender 2 of the frame 3 an agricultural vehicle. The agricultural vehicle comprises a wheel 4 which can be changed from a narrow tire shown schematically at 4A to a wide tire 4B. An arched existing fender 2 is provided of a width to cover the wheel tire 4A having an inner side edge 5 of the existing fender and an outer side edge 6 of the existing fender. The existing fender 2 is mounted at spaced positions 7, 8 along the existing fender on a frame member 9 of the vehicle so as to partly surround the wheel as shown in FIG. 3.

An extension apparatus is provided which includes an arched fender extension portion 10 having a curvature matching that of the existing fender 2 of the vehicle. An edge 11 of the arched fender extension portion 10 is arranged to butt generally against the outer side edge 6 of the existing fender.

The mounting is effected by first and second mounting brackets 12, 13 supplied as part of the apparatus and arranged to be mounted on the existing fender. The first and second brackets 12, 13 are mounted on screw fasteners 14 of brackets 15 of the existing fender at the respective spaced mounting locations 7, 8.

Each of the first and second brackets 12, 13 comprises a flat strap 16 fastened onto an upper surface 2A of the existing fender 2 so as to extend in a direction across the existing fender 2 to a position adjacent the outer edge 6.

The fender attachment includes first and second connectors 17 mounted on the arched fender extension portion 10 for engaging the brackets 12 and 13 and arranged to pull the edge 11 of the arched fender extension portion 10 into butting engagement with the outer side edge 6 of the existing fender.

Each of the first and second connectors 17 comprises a flat strap 18 fastened onto an upper surface 10A of the extension portion 10 so as to extend in a direction across the extension portion to an end 19 at a position just beyond the edge 11.

Thus the flat straps 16 and 18 lie in a common plane with the end 20 of the first flat strap 16 engaging the end 19 of the second flat strap 18 so that they are held in the butting position coplanar to hold the existing fender and the additional attachment portion in the coplanar arrangement shown in FIG. 1.

The end 19 of the second flat strap 18 is located outwardly of the edge 11 of the extension portion 10 to assist in holding the portions in the coplanar relationship and to resist any tendency of the additional portion to ride up of to tilt up. This tendency is also resisted by the arch shape of the two portions.

Each of the connectors 17 includes a bolt 21 mounted in a sleeve 22, 23 extending in a direction across the extension portion 17 with the bolt engaging into a threaded sleeve 24 of the respective bracket 12, 13. The end face of the threaded sleeve 24 lies at the end 20 and the end face of the sleeve 23 lies at the end 19 so that these end faces are drawn into engagement when the bolt is tightened into the threaded sleeve 24 to resist any tendency of the edge 11 to ride up over the edge 6. The edge 11 lies in a common plane with the main bodies of the existing ender and the additional portion so that it is a flat raw edge. The outer edge 10B of the extension portion 10 is however downwardly curved out of the common plane so as to provide additional strength and resistance to flexing of the additional portion 10.

The additional portion 10 can be formed by molding a suitable plastics material to provide sufficient strength and resistance to flexing and to define the inner flat raw edge 11 and eh outer downwardly curved edge 10A.

The outer side edge 6 of the existing fender includes a down turned flange portion 6A underlying the main common plane of the main body of the fender so that the edge 11 of the extension portion 10 butts the existing fender 2 at a position 6B spaced inwardly of the flange portion 6A.

In order to match the width of the wider tire 4B, the width of the extension portion 10 is substantially equal to a width of the existing fender 2.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An agricultural vehicle comprising:

a frame of the agricultural vehicle;

a wheel arrangement rotatable about a wheel axis including a narrow tire and a wide tire where the narrow tire can be removed and replaced by the wide tire;

an existing fender for use with the narrow tire extending in an arch around the axis and in a direction longitudinally of the axis across the narrow tire of the wheel arrangement from an inner side edge of the existing fender generally aligned with an inner edge of the narrow tire to an outer side edge of the existing fender generally aligned with the outer edge of the narrow tire;

the existing fender being mounted at least at first and second spaced positions along the existing fender around said arch on the vehicle frame;

and a fender extension apparatus for attachment to the existing fender for use with the wide tire comprising:

a fender extension portion extending in said arch around the axis having a curvature in said arch around the axis matching that of the existing fender;

an inner side edge of the arched fender extension portion being arranged to butt against the outer side edge of the existing fender;

the fender extension portion extending in a direction longitudinally of the axis from said outer side edge of the existing fender to an outer side edge of the fender extension portion generally aligned with the outer edge of the wide tire;

a first bracket mounted on the existing fender;

a second bracket mounted on the existing fender at a position spaced around said arch from the first bracket;

a first connector mounted on the fender extension portion for engaging the first bracket and arranged to pull the inner side edge of the fender extension portion into butting engagement with the outer side edge of the existing fender;

and a second connector mounted on the fender extension portion for engaging the second bracket and arranged to pull the edge of the arched fender extension portion into butting engagement with the outer side edge of the existing fender.

2. The agricultural vehicle according to claim 1 wherein the first and second brackets are arranged respectively at the first and second positions.

3. The agricultural vehicle according to claim 2 wherein the first and second brackets are mounted on fasteners of the existing fender at said first and second positions.

4. The agricultural vehicle according to claim 1 wherein each of the first and second brackets comprises a flat strap fastened onto an upper surface of the existing fender so as to extend in a direction across the existing fender.

5. The agricultural vehicle according to claim 1 wherein each of the first and second connectors comprises a flat strap fastened onto an upper surface of the fender extension portion so as to extend in a direction across the fender extension portion.

6. The agricultural vehicle according to claim 1 wherein each of the first and second brackets comprises a first flat strap fastened onto an upper surface of the existing fender so as to extend in a direction across the existing fender, wherein each of the first and second connectors comprises a second flat strap fastened onto an upper surface of the fender extension portion so as to extend in a direction across the fender extension portion and wherein the end of the first flat strap engages an end of the second flat strap.

7. The agricultural vehicle according to claim 6 wherein the end of the second flat strap is located outwardly of the edge of the fender extension portion.

8. The agricultural vehicle according to claim 1 wherein each of the connectors includes a bolt mounted in a sleeve extending in a direction across the fender extension portion which engages into a threaded sleeve of the respective bracket.

9. The agricultural vehicle according to claim 1 wherein the edge of the fender extension portion lies in a common line longitudinal of said wheel axis with a main body of the fender extension portion.

10. The agricultural vehicle according to claim 9 wherein the edge of the fender extension portion lies in a common line longitudinal of said wheel axis with a main body of the existing fender.

11. The agricultural vehicle according to claim 9 wherein an outer edge of the fender extension portion is downwardly curved out of the common line.

12. The agricultural vehicle according to claim 10 wherein the outer side edge of the existing fender includes a down turned flange portion so that the inner side edge of the fender extension portion butts the existing fender at a position spaced inwardly of the flange portion.

13. The agricultural vehicle according to claim 1 wherein a width of the fender extension portion in said longitudinal direction is substantially equal to a width of the existing fender in said longitudinal direction.

* * * * *